United States Patent [19]
Ishikawa et al.

[11] Patent Number: 5,895,515
[45] Date of Patent: Apr. 20, 1999

[54] INCREASING A FLUORINE COMPOUND FLOW RATE DURING A VAD PROCESS

[75] Inventors: Shinji Ishikawa; Masumi Ito; Sumio Hoshino, all of Yokohama, Japan

[73] Assignee: Sumitomo Electric Industries, Ltd., Osaka, Japan

[21] Appl. No.: 08/754,990

[22] Filed: Nov. 22, 1996

[30] Foreign Application Priority Data

Dec. 4, 1995 [JP] Japan .................. 7-315469

[51] Int. Cl.$^6$ .................................. C03B 37/018
[52] U.S. Cl. .................. 65/377; 65/397; 65/414
[58] Field of Search ................... 65/371, 397, 414

[56] References Cited

U.S. PATENT DOCUMENTS

| | | | |
|---|---|---|---|
| 4,162,908 | 7/1979 | Ray | 65/397 |
| 4,221,825 | 9/1980 | Guerden | 65/397 |
| 4,586,943 | 5/1986 | Kyoto | 65/397 |
| 4,627,866 | 12/1986 | Kanamori et al. | |
| 5,039,325 | 8/1991 | Miller et al. | |

FOREIGN PATENT DOCUMENTS

| | | |
|---|---|---|
| 0 540 042 | 5/1993 | European Pat. Off. |
| 60-051627 | 3/1985 | Japan |
| 61-236626 | 10/1986 | Japan |
| 1-282507 | 11/1989 | Japan |

OTHER PUBLICATIONS

Derwent Abstract 86–316770/48 & JP610236626A Feb. 1997.

*Primary Examiner*—John Hoffmann
*Attorney, Agent, or Firm*—Pillsbury Madison & Sutro LLP

[57] ABSTRACT

In a soot-deposition container, raw material gas and at the tip of a starting glass rod, combustion gas, and carrier gas are supplied to a core-depositing burner and raw material gas, combustion gas, carrier gas, and gas for doping of fluorine are supplied to a cladding-depositing burner, thereby forming porous glass soot comprised of glass soot for core and glass soot for cladding. With growth of soot, the supply amount of the fluorine-doping gas is increased while supply amounts of the other gases are kept constant. Next, dehydration process and transparentizing process of soot are carried out to obtain a glass preform for optical fiber. Fabricated in this way is the glass preform for optical fiber having the silica glass portion doped with low-concentration fluorine with high uniformity in the growth direction.

7 Claims, 14 Drawing Sheets

INCREASING A FLUORINE COMPOUND FLOW RATE DURING A VAD PROCESS

BACKGROUND OF THE INVENTION

1. Field of the Invention

The present invention relates to a method for fabricating a glass preform for optical fiber having a silica glass portion doped with fluorine, which has a step of performing deposition of fine glass particles by the vapor phase axial deposition (VAD) process.

2. Related Background Art

Optical fibers have the structure of the core and the cladding having a lower refractive index than the core and surrounding the core. Utilizing the refractive index difference between the core and the cladding, light is transmitted as confined in and near the core.

Thus, in order to achieve the function as an optical fiber, a dopant for raising or lowering the refractive index is added to a base material, thereby realizing a desired refractive index profile. If the base material is silica glass, fluorine is suitably used as a dopant for lowering the refractive index.

The optical fiber having the silica glass portion doped with fluorine is fabricated by heating and drawing a glass preform for optical fiber having the silica glass portion doped with fluorine. Such glass preforms for optical fiber have been fabricated heretofore as follows.

The first conventional method for forming the silica glass portion doped with fluorine (hereinafter referred to as conventional example 1) is arranged, for example as disclosed in Japanese Patent Publication No. 62-38292, in such a manner that, for growing a body of fine glass particles by the VAD process, glass raw material gas and combustion gas are supplied and glass particles are deposited in the direction of target axis by flame hydrolysis and thereafter a consolidating step of glass particles is carried out under an atmosphere of fluorine compound gas, thereby obtaining a glass preform for optical fiber having the glass portion doped with fluorine.

The second conventional method for forming the silica glass portion doped with fluorine (hereinafter referred to as conventional example 2) is arranged, for example as disclosed in Japanese Laid-open Patent Application No. 59-232934, in such a manner that, for growing a body of fine glass particles by the VAD process, the both glass raw material gas and combustion gas, or only the combustion gas containing the fluorine compound gas in a concentration kept constant in terms of the time is supplied and fine glass particles are deposited in the direction of target axis by flame hydrolysis and thereafter the fine glass particles are consolidated, thereby obtaining a glass preform for optical fiber.

The following methods are proposed as methods for making fluorine doping concentrations uniform mainly in the radial direction in the glass preform for optical fiber the base material of which is silica glass.

In the method disclosed in U.S. Pat. No. 5,039,325, first, the fluorine compound gas is mixed in the glass raw material gas and fine glass particles are deposited by the outside vapor deposition process. Next, the volume of a heating furnace is set slightly larger than that of a deposit body of glass particles and heating is effected on the deposit body as decreasing supply amounts of the atmospheric gas upon heating so as to transparentize the deposit body. As a result, a vaporization amount of fluorine is decreased from the peripheral portion upon the heating transparentization, thereby obtaining the glass preform for optical fiber with the fluorine doping amounts uniform in the radial direction.

In the method as disclosed in Japanese Laid-open Patent Application No. 61-236626, first, fine glass particles are deposited using a mixture of the fluorine compound gas mixed in the glass raw material gas in lower concentration as approaching the peripheral portion. Next, the deposit body is heated to be transparentized under an atmosphere containing fluorine or a fluorine compound. As a result, differences of fluorine doping amounts in the radial direction upon deposition of glass particles are canceled by differences of fluorine doping amounts in the radial direction upon heating transparentization, thereby obtaining a glass preform for optical fiber with fluorine doping amounts uniform in the radial direction.

SUMMARY OF THE INVENTION

An object of the present invention is to provide a method for fabricating a glass preform for optical fiber having a silica glass portion doped with low-concentration fluorine with high uniformity in the growing direction.

The method for fabricating a glass preform for optical fiber according to the present invention is a method for fabricating a glass preform for optical fiber having a silica glass portion doped with fluorine by vapor phase axial deposition (VAD; vapor Phase Axial Deposition), which comprises (a) a first step of introducing glass raw material gas and fluorine compound gas into oxyhydrogen flame and depositing fine glass particles in a direction of a target axis by flame hydrolysis, thereby growing a deposit body of fine glass particles in the direction of the target axis, wherein a period of growth of the deposit body of fine glass particles comprises a period for increasing a flow rate of the fluorine compound gas supplied; and (b) a second step of heating to transparentize the deposit body of fine glass particles.

In the method for fabricating a glass preform for optical fiber of conventional example 1, the fluorine doping amounts are proportional to the one-quarter power of the fluorine compound gas in the atmospheric gas, as well known. Thus, fluorine was able to be added in the range of the decrease rate of refractive index of from −0.2% to −0.7% approximately with respect to pure silica, but it was not easy to realize such low-concentration doping of fluorine as to achieve the decrease rate of the refractive index of −0.2 or less % with respect to pure silica.

Therefore, in order to realize such low-concentration doping of fluorine as to achieve the decrease rate of refractive index of −0.2 or less % by fluorine doping in the fluorine-doping region, a suitably applicable method is the method for effecting doping of fluorine by supplying the glass raw material gas and fluorine compound gas to flame upon deposition of glass particles.

However, according to the knowledge attained from the results of research by the inventors, in the optical fiber preforms fabricated by the method for fabricating a glass preform for optical fiber of conventional example 2, fluorine concentrations in deposits of glass particles formed in the initial stage of the deposition process of glass particles are higher than those in deposits of glass particles formed in the final stage of the deposition process of glass particles, and therefore, it is not possible to obtain optical fibers with good uniformity of index profile in the longitudinal direction.

The nonuniformity of index profile results in, typically, causing longitudinal nonuniformity of cut-off wavelength $\lambda_c$ of optical fiber. Accordingly, it is necessary to enhance the uniformity of index profile in the longitudinal direction of optical fiber in order to obtain optical fibers with stable transmission characteristics.

According to the knowledge of the inventors, the above phenomenon is considered to occur by the following two effects.

The first effect is as follows. Since after stop of deposition on the start end side of deposition of the deposit body of glass particles, the fluorine compound gas is also still supplied to the portion under deposition present vertically below the start end, the atmospheric gas around the start end side of deposition of the deposit body of glass particles thus contains the fluorine compound gas. Further, a high-temperature state upon deposition continues, because the deposit body of glass particles has a low thermal conductivity. Namely, on the start end side of deposition, the high-temperature deposit body of glass particles is exposed to the atmosphere of fluorine compound gas for a longer time than on the end side of stop of deposition. As a result, if the flow rates of the fluorine compound gas are constant throughout the period of the step of deposition, the doping amounts of fluorine on the start end side of deposition of the deposit body of glass particles are greater than those on the stop end side of deposition of the deposit body of glass particles.

The second effect is as follows. In the step of heating transparentization of the deposit body of glass particles, normally, the deposit body of glass particles is inserted into the heating furnace, the heater is activated to raise the temperature to start heating from the end side of stop of deposition of the deposit body of glass particles, and thereafter the deposit body of glass particles is moved relative to the heater. Then heating is continued up to the end side of start of deposition finally. In this step of transparentization, with increase in temperature of heater radiation heat from the heater irradiates the end side of stop of deposition of the deposit body of glass particles so as to heat the end side of stop of deposition of the deposit body of glass particles. In other words, the heating period is longer on the end side of stop of deposition of the deposit body of glass particles. Accordingly, if the atmospheric gas does not contain the fluorine compound, the vaporization amount of fluorine becomes larger from the end side of stop of deposition of the deposit body of glass particles than from the other portions.

A combination of the above two effects causes the longitudinal change of fluorine doping amounts.

Since the method for fabricating a glass preform for optical fiber according to the present invention is arranged so that in depositing fine glass particles in the direction of the target axis the concentration of fluorine compound in the supplied gas is increased with growth of the deposit body of glass particles in the direction of the target axis, the fluorine doping amounts upon deposition of glass particles are smaller in portions closer to the end side of start of deposition of glass particles, which are exposed to the gas atmosphere containing fluorine for a longer period since deposition of glass particles, whereas the fluorine doping amounts upon deposition of glass particles are larger in portions closer to the end side of stop of deposition of glass particles, which are exposed to the gas atmosphere containing fluorine for a shorter period since deposition of glass particles.

On the other hand, when the high-temperature deposit body of glass particles is exposed to the gas atmosphere containing fluorine, the fluorine doping amount increases in accordance with the period of exposure.

Accordingly, the fluorine doping amounts become uniform in the direction of the target axis at the time of completion of the first step and the second step in the method for fabricating a glass preform for optical fiber according to the present invention.

The inventors conducted experiments to check uniformity of decrease rate of refractive index ($\Delta n_F$) in the direction of growth depending upon change amounts of supply of $CF_4$ gas, which is fluorine compound gas to the glass raw material gas $SiCl_4$, in column fluorine-doped silica glass by the VAD process. The decrease rate of refractive index, $\Delta n_F(L)$, is defined by the following equation.

$$\Delta n_F(L) = \{n_F(L) - n_0\}/n_0$$

where $n_0$: refractive index of pure silica glass

L: distance from the start end $n_F(L)$: refractive index at L

FIG. 1 is a graph to show the results of the experiments. FIG. 1 shows the results of (1) the case of monotonically and linearly changing the supply amount of $CF_4$ from 35 SCCM to 70 SCCM (Experiment 1), (2) the case of keeping the supply amount of $CF_4$ constant at 50 SCCM (Experiment 2), and (3) the case of monotonically and linearly changing the supply amount of $CF_4$ from 5 SCCM to 100 SCCM (Experiment 3). FIG. 1 proved that uniformity of the decrease rate of refractive index ($\Delta n_F$) cannot be achieved without changing the supply amount of $CF_4$ and that uniformity of the decrease rate of refractive index ($\Delta n_F$) cannot be achieved with too large change of supply amount of $CF_4$.

The inventors also conducted experiments to change a ratio of initial flow rate value and final flow rate value of $CF_4$ gas as linearly changing the flow rate of $CF_4$ gas. FIG. 2 is a graph to show the results of these serial experiments, which shows a change in index change amount $\Delta(\Delta n_F)$ defined by the following equation against R={(final flow rate of $CF_4$) /(initial flow rate of $CF_4$)}.

$$\Delta(\Delta n_F) = \Delta n_F^{MAX} - \Delta n_F^{MIN}$$

where $\Delta n_F^{MAX}$: maximum value of $\Delta n_F(L)$ $\Delta n_F^{MIN}$: minimum value of $\Delta n_F(L)$ FIG. 2 proved that the index change amount $\Delta(\Delta n_F)$ becomes minimal at R~2.0 and that in order to achieve preferable uniformity of $\Delta(\Delta n_F) \leq 0.005$, the preferable range is R=1.5 to 2.5, i.e., that the final flow rate of $CF_4$ gas is to be set preferably to a value in the range of 1.5 to 2.5 times the initial flow rate of $CF_4$ gas.

The inventors further conducted experiments to measure a change of the decrease rate of refractive index in the direction of growth due to fluorine doping with respect to the case of no doping with fluorine, i.e., with respect to pure silica glass with fixing the initial flow rate of 35 SCCM and the final flow rate of 70 SCCM (i.e., with R=2.0), for the following four ways of changing the flow rate of $CF_4$ gas: (1) the case of linear change (above Experiment 1); (2) the case of change of a quadratic function (Experiment 4); (3) the case of change of a cubic function (Experiment 5); and (4) the case of change of a function of the one-half degree (Experiment 6).

FIG. 3 is a graph to show the change of flow rate of $CF_4$ gas in the direction of growth in Experiments 1 and 4 to 6. Since the growth rate of glass particles in the target-axis direction is almost constant, the distance from the growth start end is proportional to the time from start of growth. Therefore, the description hereinafter uses either the distance from the growth start end or the time from the growth start selectively with necessity, but it is noted that they have equivalent meaning.

In FIG. 3, the flow rate $Vf_1(t)$ of $CF_4$ in Experiment 1, the flow rate $Vf_4(t)$ of $CF_4$ in Experiment 4, the flow rate $Vf_5(t)$ of $CF_4$ in Experiment 5, and the flow rate $Vf_6(t)$ of $CF_4$ in Experiment 6 are determined as follows in the unit of SCCM:

$$Vf_1(t)=35t/t_e+35$$

$$Vf_4(t)=35(t/t_e)^2+35$$

$$Vf_5(t)=35(t/t_e)^3+35$$

$$Vf_6(t)=35(t/t_e)^{1/2}+35$$

where t: time having elapsed from growth start time $t_e$: time of growth stop.

FIG. 4 is a graph to show the experiment results of Experiments 1 and 4 to 6, showing the measurement results of change of the decrease rate of refractive index in the growth direction to pure silica glass, for the glass bodies obtained in the respective experiments.

FIG. 4 proved that Experiment 4 has the highest uniformity of fluorine doping amount, thus suggesting that the most preferable change of flow rate of $CF_4$ is the change of quadratic function.

It was also confirmed that in the case of Experiment 1 wherein the change of flow rate of $CF_4$ is of a linear function, uniformity of the decrease rate of refractive index can be maintained in the growth direction as described above, but the curve of FIG. 4 representing Experiment 5 with the change of flow rate of $CF_4$ being of the cubic function is heavily convex while the curve of FIG. 4 representing Experiment 6 with the change of flow rate of $CF_4$ being of the function of the one-half degree is heavily concave. Namely, it was confirmed that the supply amount of fluorine compound gas is preferably a linear or quadratic function of the length of deposition in the target-axis direction of glass particles, i.e., of the passing time from the growth start time.

Here, let us suppose a case in which the length of growth in the target-axis direction of the deposit body of glass particles is long. Considering the two effects, as described above, which are potential causes of nonuniformity of fluorine doping amount in the target-axis direction, if the length of growth is long in the target-axis direction of the deposit body of glass particles, the same thermal hysteresis from the viewpoint of fluorine doping is applied up to a certain length from the position of growth start end. This means that in the portion where the same thermal hysteresis from the viewpoint of fluorine doping is applied, the uniformity of fluorine doping amount is high when the supply of fluorine gas is constant.

Therefore, in the cases where the length of growth in the target-axis direction of the deposit body of glass particles is so long as to form the portion in which the same thermal hysteresis from the viewpoint of fluorine doping can be applied, the flow rate of fluorine compound gas is kept constant from the growth start time up to a predetermined time and thereafter the flow rate of fluorine compound gas is increased in the above preferable pattern of change, whereby the glass preform for optical fiber can be obtained with high uniformity of fluorine doping amount in the growth direction.

The inventors conducted experiments to measure a change of the decrease rate of refractive index in direction of growth with changing a deposited length at which the flow rate of the fluorine compound gas started to change. As the result of these experiments, the inventors find that it is preferable to start to change the flow rate of the fluorine compound gas when the length of the rest part to be deposited is 4±0.5 times as long as the diameter of the deposit body from the viewpoint of achieving the uniformity of fluorine doping.

Since doping of fluorine is carried out for the purpose of decreasing the refractive index, the method for fabricating a glass preform for optical fiber according to the present invention can be suitably adopted for fabrication of a glass preform for optical fiber having a portion to become the cladding doped with fluorine. Particularly, the method for fabricating a glass preform of the present invention is effective in making the fluorine doping amounts uniform in the axial direction in the region of the decrease rate of refractive index to silica glass below −0.2%.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
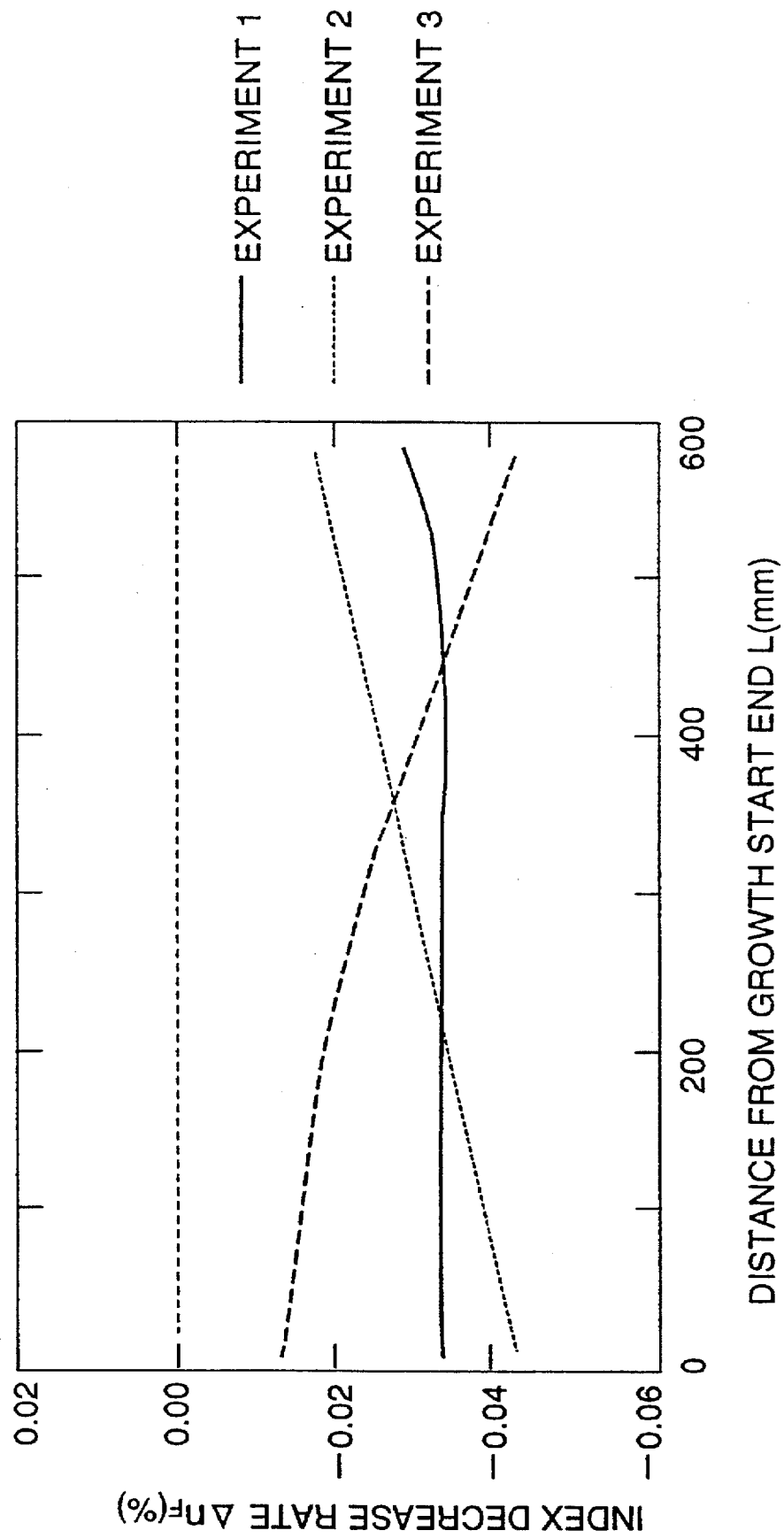
FIG. 1 is a graph to show position dependence of index decrease amount in Experiments 1, 2, and 3.
Figure 2:
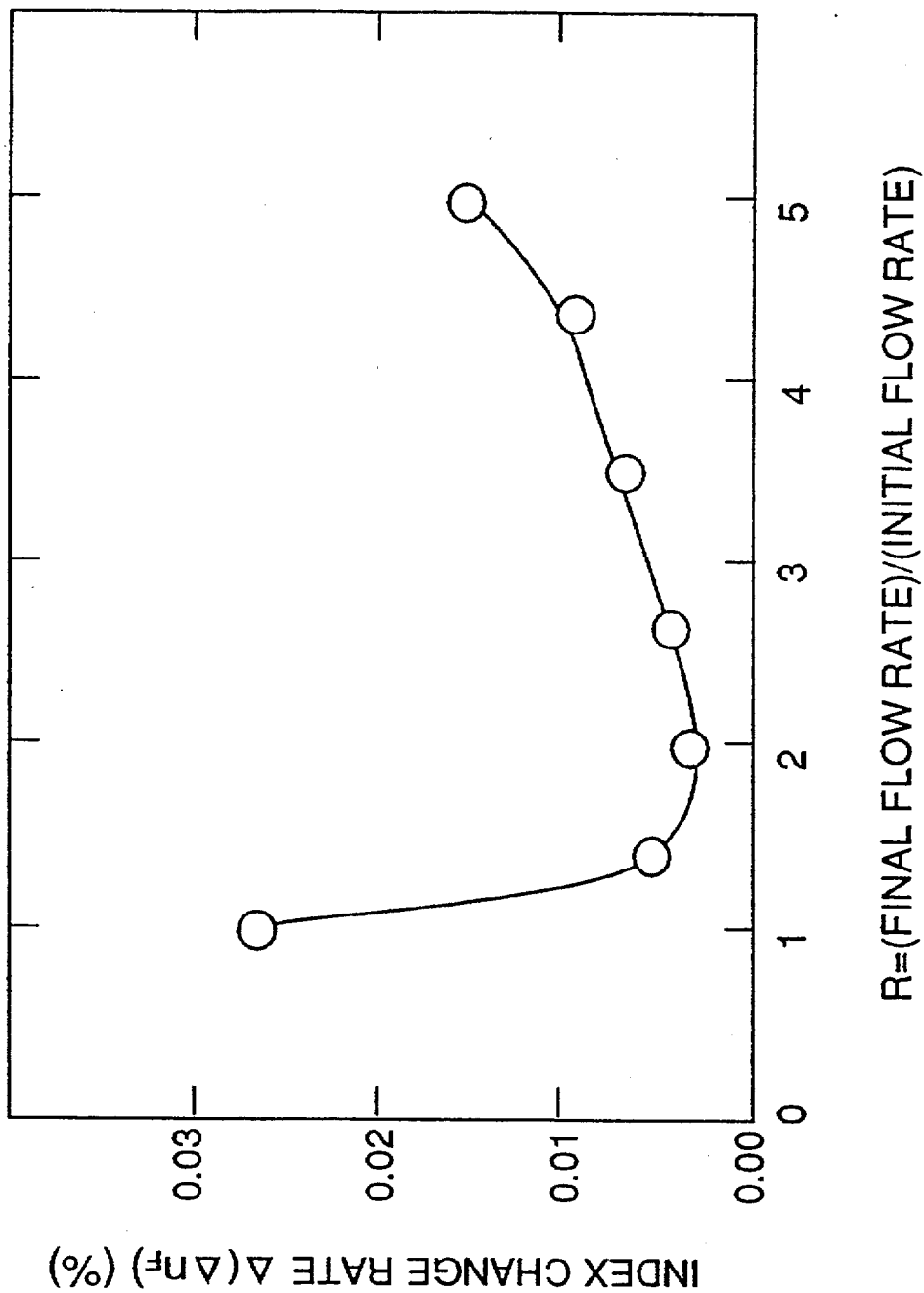
FIG. 2 is a graph to show the change of index change amount ($\Delta(\Delta n_F)$) depending upon the ratio (R) of initial flow rate and final flow rate of fluoride compound.
Figure 3:
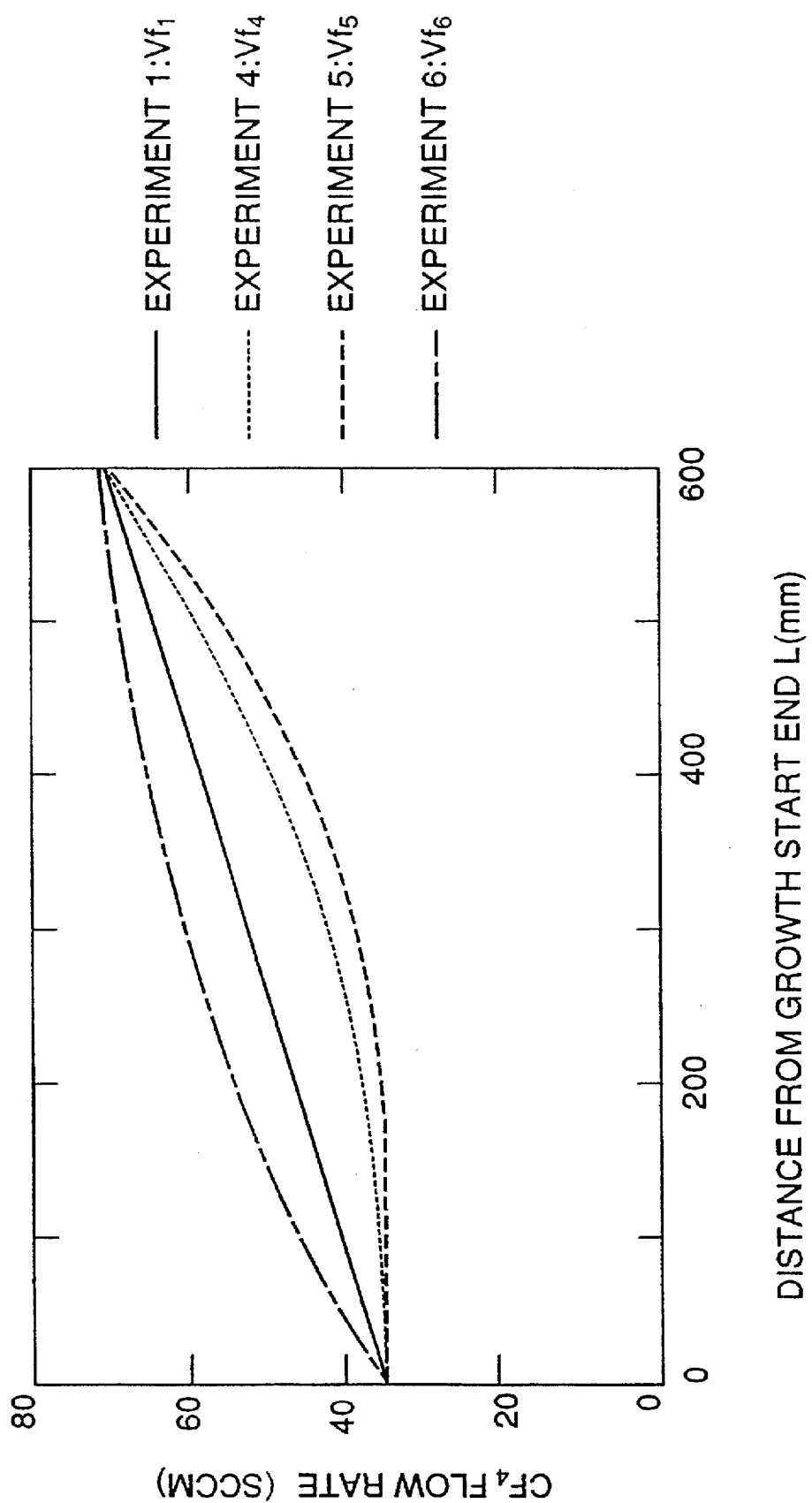
FIG. 3 is a graph to show the time change of flow rate of fluoride compound in Experiments 1, 4, 5, and 6.
Figure 4:
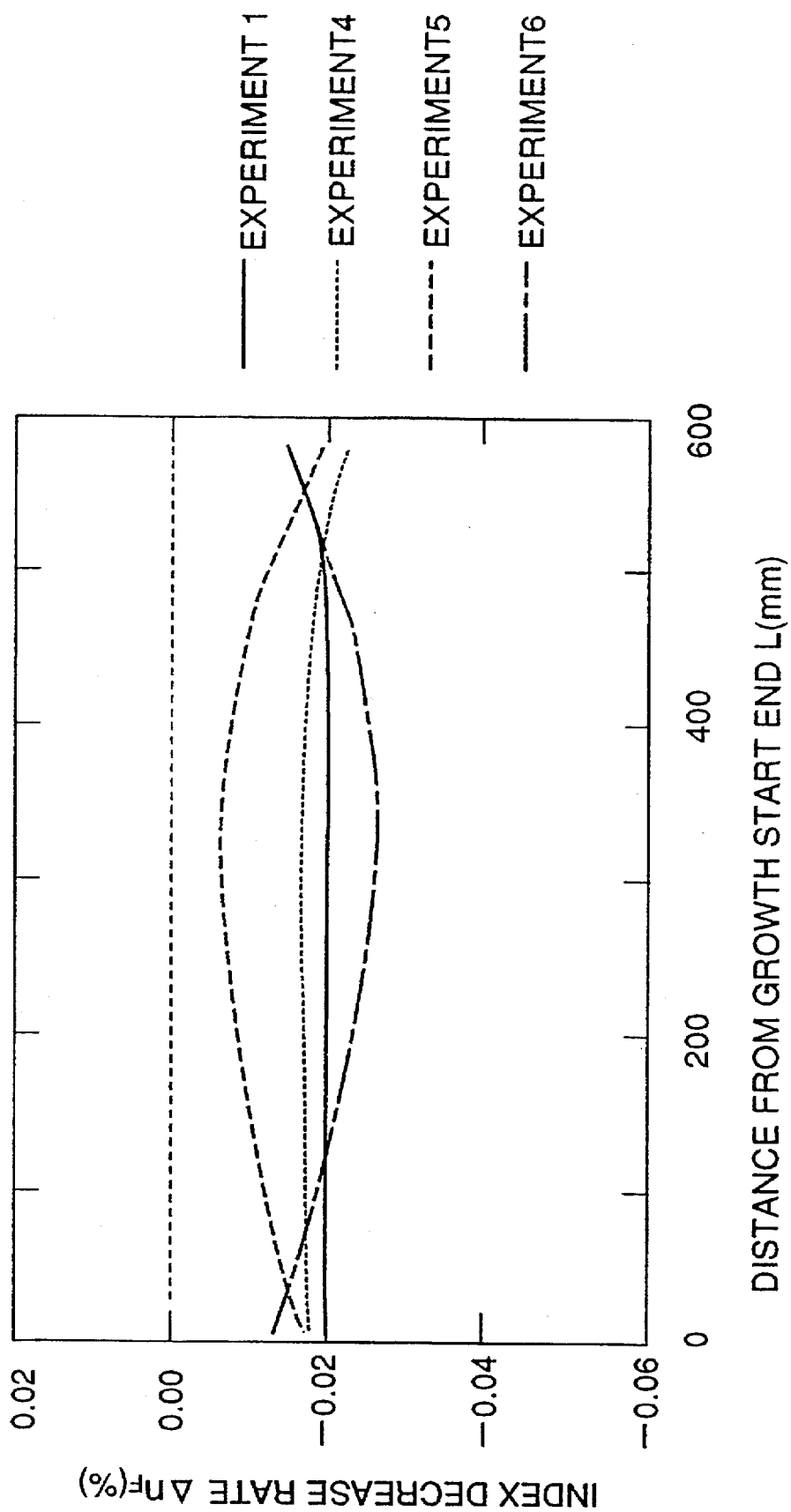
FIG. 4 is a graph to show position dependence of the decrease rate of refractive index to pure silica glass in Experiments 1, 4, 5, and 6.

The embodiments of the method for fabricating a glass preform for optical fiber according to the present invention will be explained with reference to the accompanying drawings. In the description with the drawings same reference numerals will denote same elements and redundant description will be omitted.

(Embodiment 1)

FIGS. 5 to 9 are explanatory drawings of Embodiment 1 of the method for fabricating a glass preform for optical fiber according to the present invention.

Figure 5:
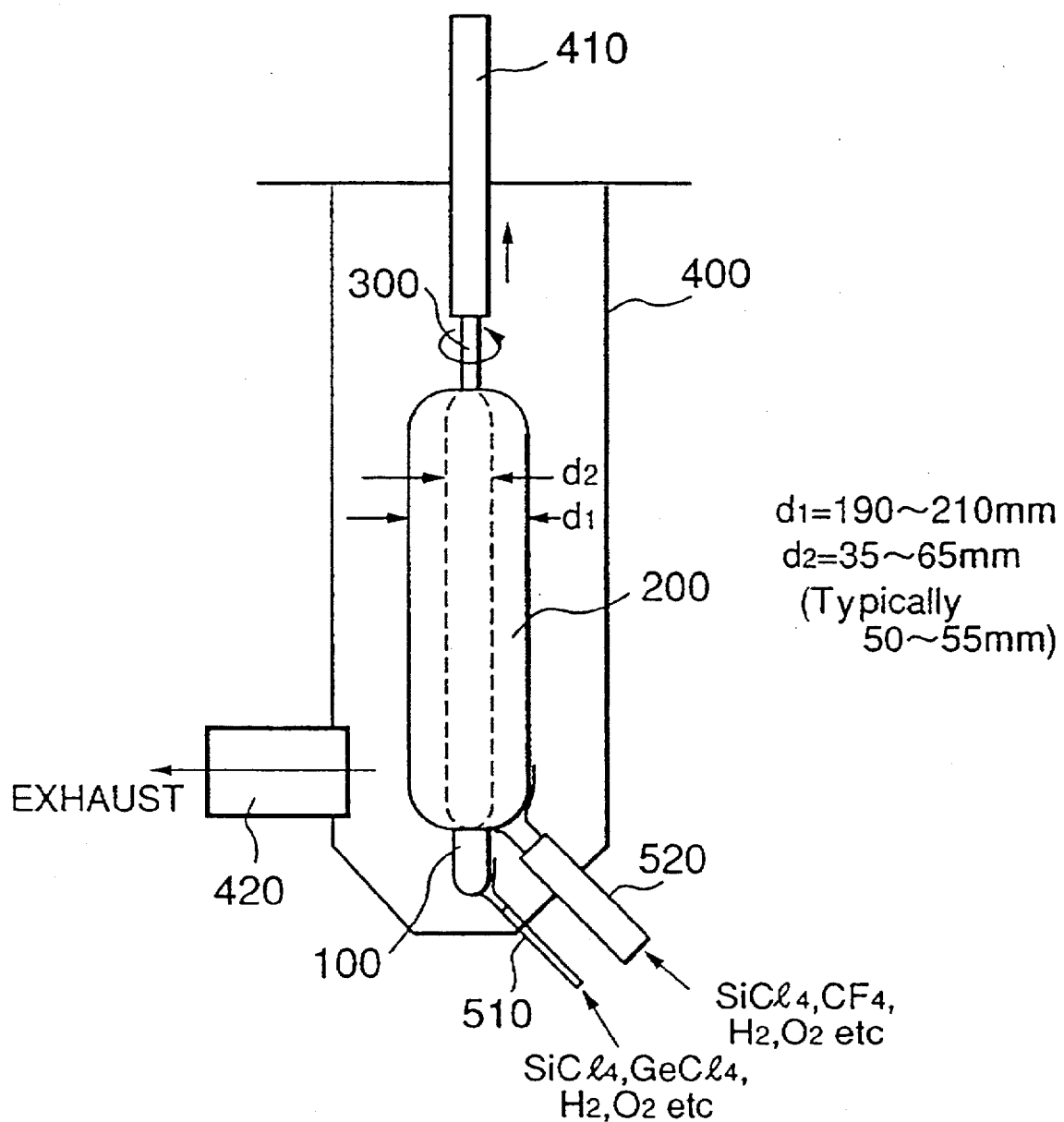
FIGS. 5 to 9 are explanatory drawings of Embodiment 1.

As shown in FIG. 5, in the method for fabricating a glass preform of the present embodiment, first, raw material gases of $GeCl_4$ and $SiCl_4$, together with combustion gases of $H_2$ and $O_2$, were supplied to a core-depositing burner 510 at the tip of starting glass rod 300 supported on a supporting rod 410 in a soot-deposition container 400 having an exhaust port 420 and, further, Ar, He, or the like was supplied as carrier gas. Also supplied to a cladding-depositing burner 520 were raw material gas of $SiCl_3$, combustion gases of $H_2$ and $O_2$, carrier gas of Ar, He, or the like, and fluorine-doping gas of $CF_4$.

In flame of burner 510 or burner 520 the glass raw material was subject to hydrolysis to form fine glass particles, and these glass particles were deposited to form porous glass soot comprised of glass soot 100 for the core and glass soot 200 for the internal cladding.

The porous glass soot was let to grow in the axial direction by pulling the support rod 410 up as rotating it. With this growth, the supply amount of $CF_4$ gas, Vf(t), was increased in accordance with the following equation while keeping supply amounts of the other gases constant:

$$Vf(t)=50(t/t_e)+50 \text{ (unit: SCCM)}$$

where t: passing time from start of growth $t_e$: passing time from start of growth to end of growth; whereby the supply amount having been 50 SCCM at start of deposition was increased monotonically and linearly up to the supply amount of 100 SCCM at the end of deposition.

The amount of growth of preform was 800 mm in the target-axis direction.

Figure 6:
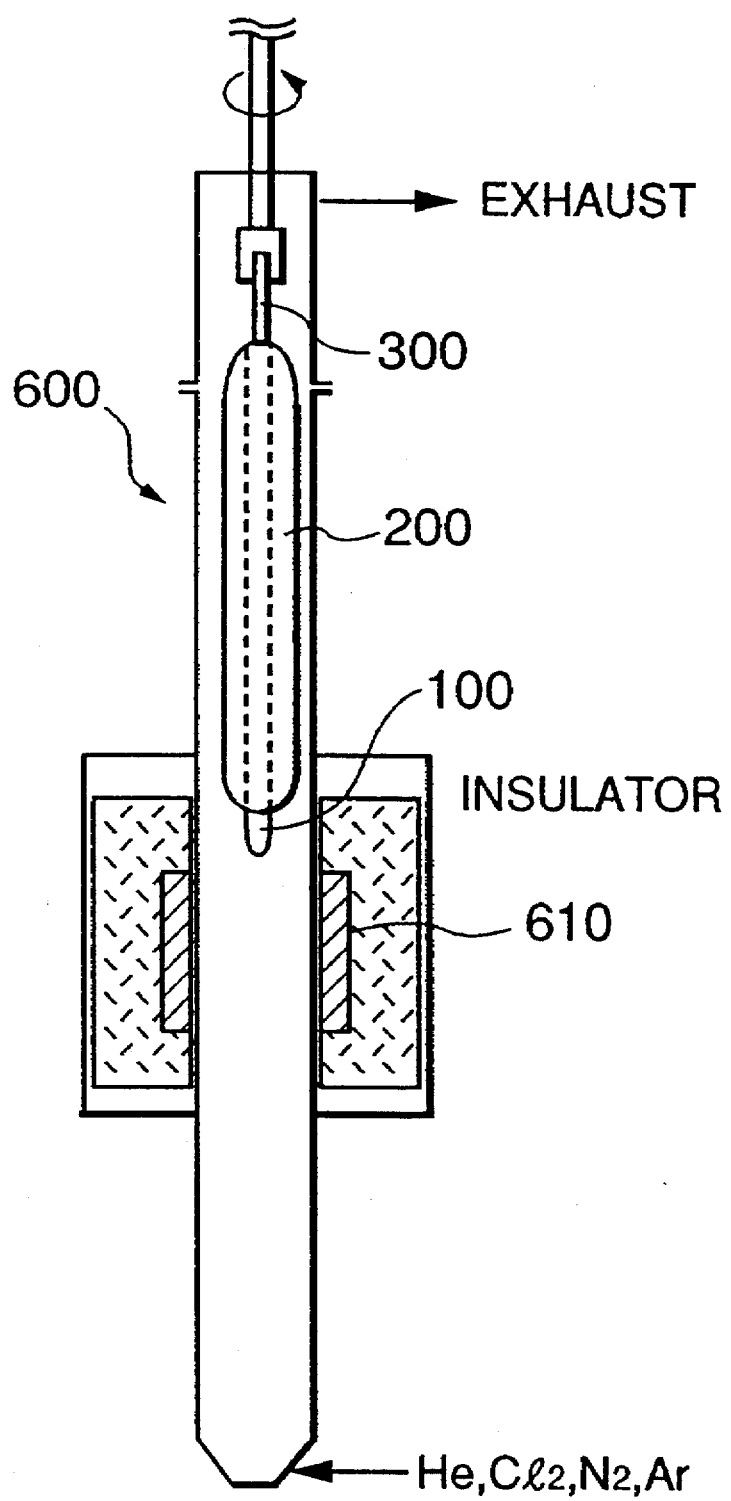
Figure 7:
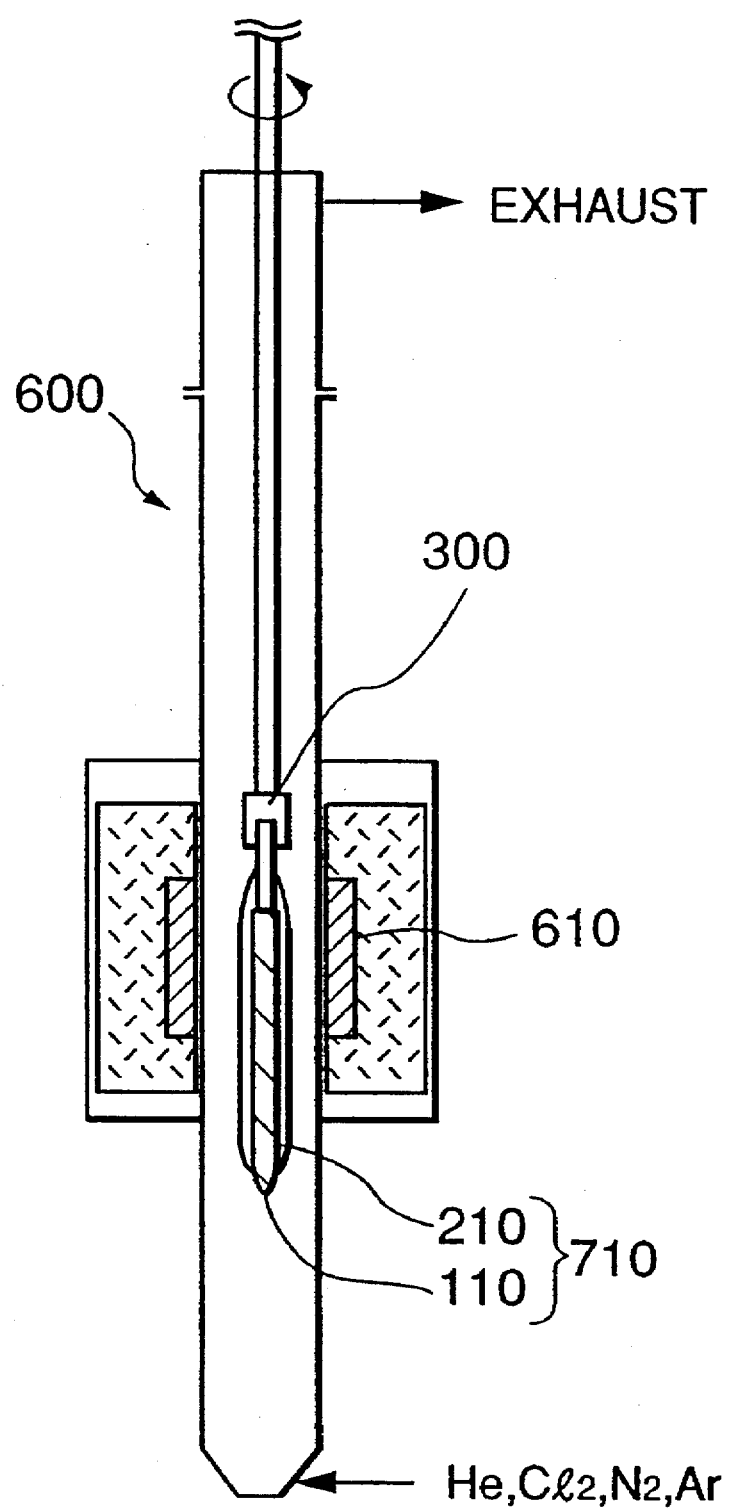

Next, the porous glass soot was inserted into a consolidating furnace 600 to perform dehydration process and transparent glass forming process. FIGS. 6 and 7 are explanatory drawings of the dehydration process and transparent glass forming process, wherein FIG. 6 shows a state at start of these processes and FIG. 7 shows a state in the middle of the processes. First, the dehydration process was carried out at the descending rate of about 10 mm/min and in an atmosphere of $Cl_2/He$=0.5/20 (slm) kept at 1000 to 1300° C. by heater 610. Then the transparent glass forming process was carried out at the descending rate of about 7 mm/min and in an atmosphere of He of almost 100% kept at 1500 to 1650° C. by heater 610. These processes yielded a glass body 710 comprised of a glass portion 110 to become the core and a glass portion 210 to become the internal cladding.

Figure 8:
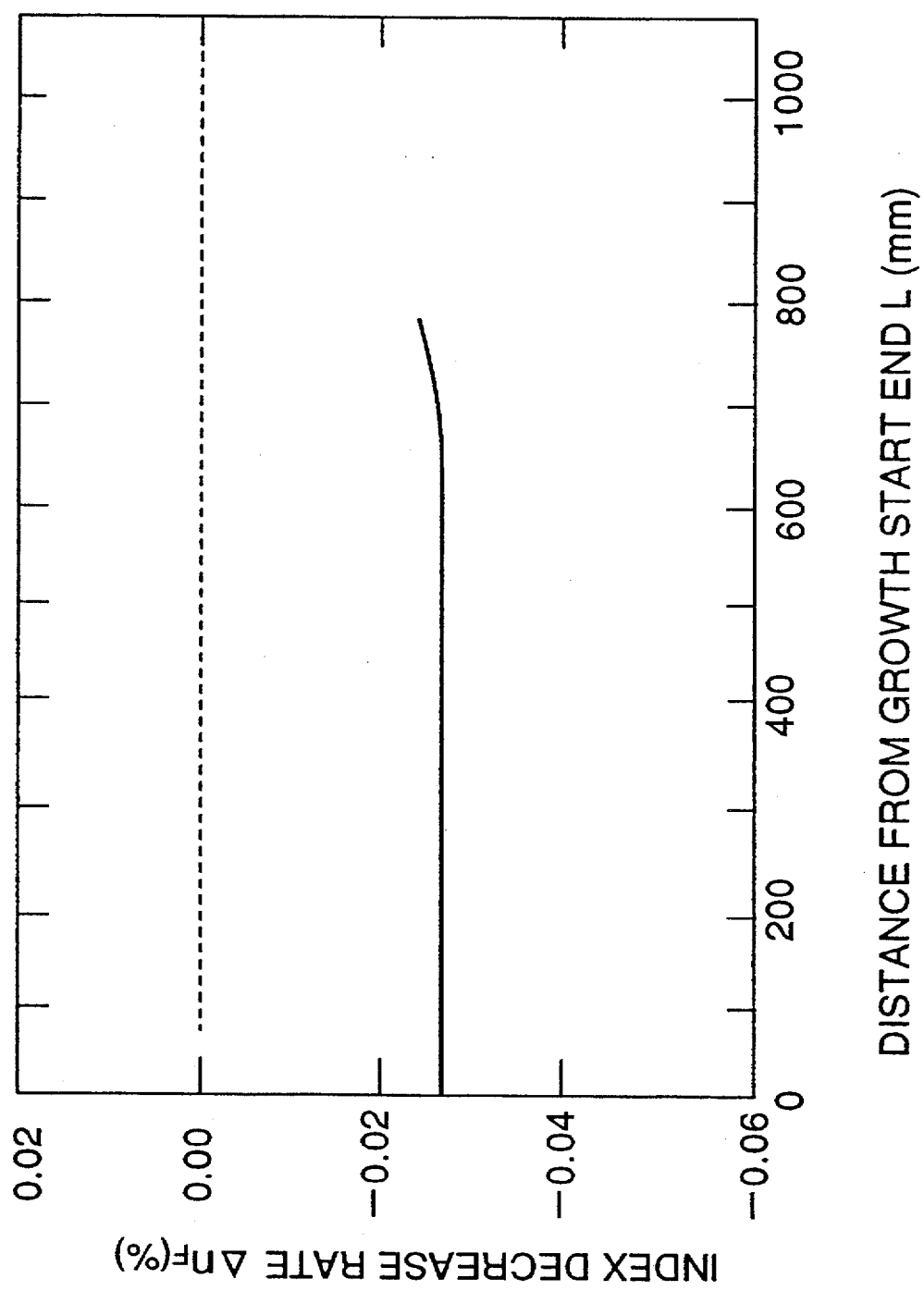

FIG. 8 is a graph to show the measurement results of change of the decrease rate of refractive index ($\Delta n_F$) of the glass portion 210 to become the internal cladding with respect to pure silica glass in the growth direction.

In the glass body 710 thus obtained, an absolute value of a difference between a value at the growth start end and a value at the growth stop end of the decrease rate of refractive index ($\Delta n_F$) of the glass portion 210 to become the internal cladding to pure silica glass was 0.003%.

Figure 9:
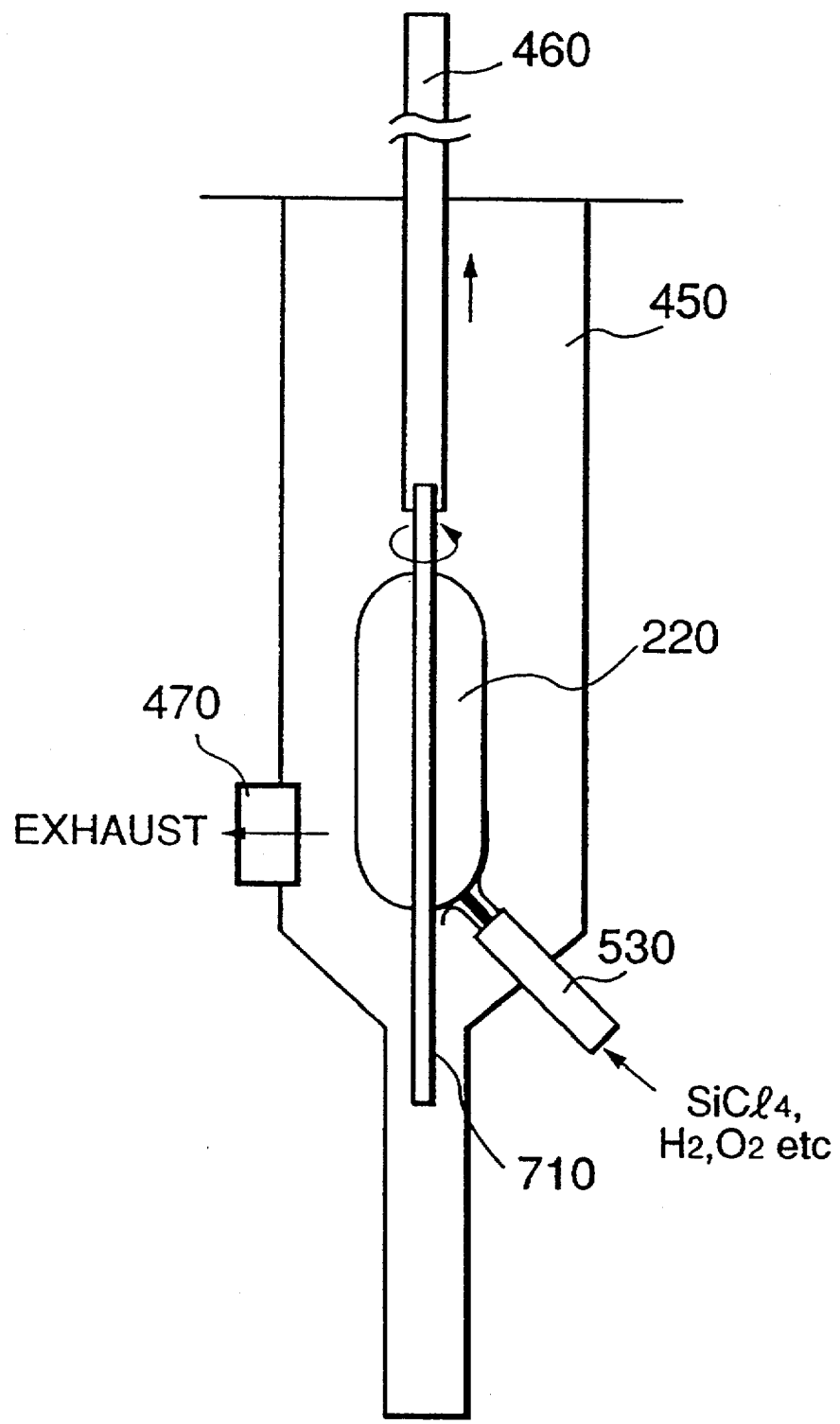

Next, as shown in FIG. 9, the glass body 310 supported by the support rod 460 was inserted into a soot-deposition container 450 having an exhaust port 470, and supplied to a deposition burner 530 for external cladding were raw material gas of $SiCl_4$, combustion gases of $H_2$ and $O_2$, and carrier gas of Ar, He, or the like.

In flame of burner 530 the glass raw material was subject to hydrolysis to form fine glass particles substantially comprised of pure silica glass and these glass particles were deposited to form porous glass soot comprised of glass soot 220 for external cladding.

The porous glass soot 220 was let to grow in the axial direction by pulling the support rod 460 up as rotating it.

Then the glass soot 220 for external cladding was heated to be transparentized in the same manner as in FIGS. 6 and 7, thereby obtaining a glass preform for optical fiber.

The glass preform for optical fiber thus obtained was drawn into a fiber, thus fabricating an optical fiber in the outer diameter of 125 μm. The cut-off wavelengths $\lambda_c$ were measured for the optical fiber. From the measurement results, an absolute value of a difference between the cut-off wavelength in the portion of the optical fiber corresponding to the growth start end of the glass preform for optical fiber and the cut-off wavelength in the portion of the optical fiber corresponding to the growth stop end of the glass preform for optical fiber was 10 nm.

(Embodiment 2)

In the present embodiment, when the soot for internal cladding was let to grow in the axial direction by deposition of glass particles of FIG. 5 in Embodiment 1, the supply amount of $CF_4$ gas Vf(t) [unit: SCCM] was increased according to the following equation while keeping the other supply amounts constant:

$$Vf(t)=75 \ (t/t_e)^2+50$$

where t: passing time from start of growth $t_e$: passing time from start of growth to end of growth; whereby the supply amount having been 50 SCCM at start of deposition was increased up to the supply amount of 125 SCCM at end of deposition.

After that, the dehydration process and transparent glass forming process as shown in FIGS. 6 and 7 were carried out in the same manner as in Embodiment 1, thereby obtaining a glass body.

Figure 10:
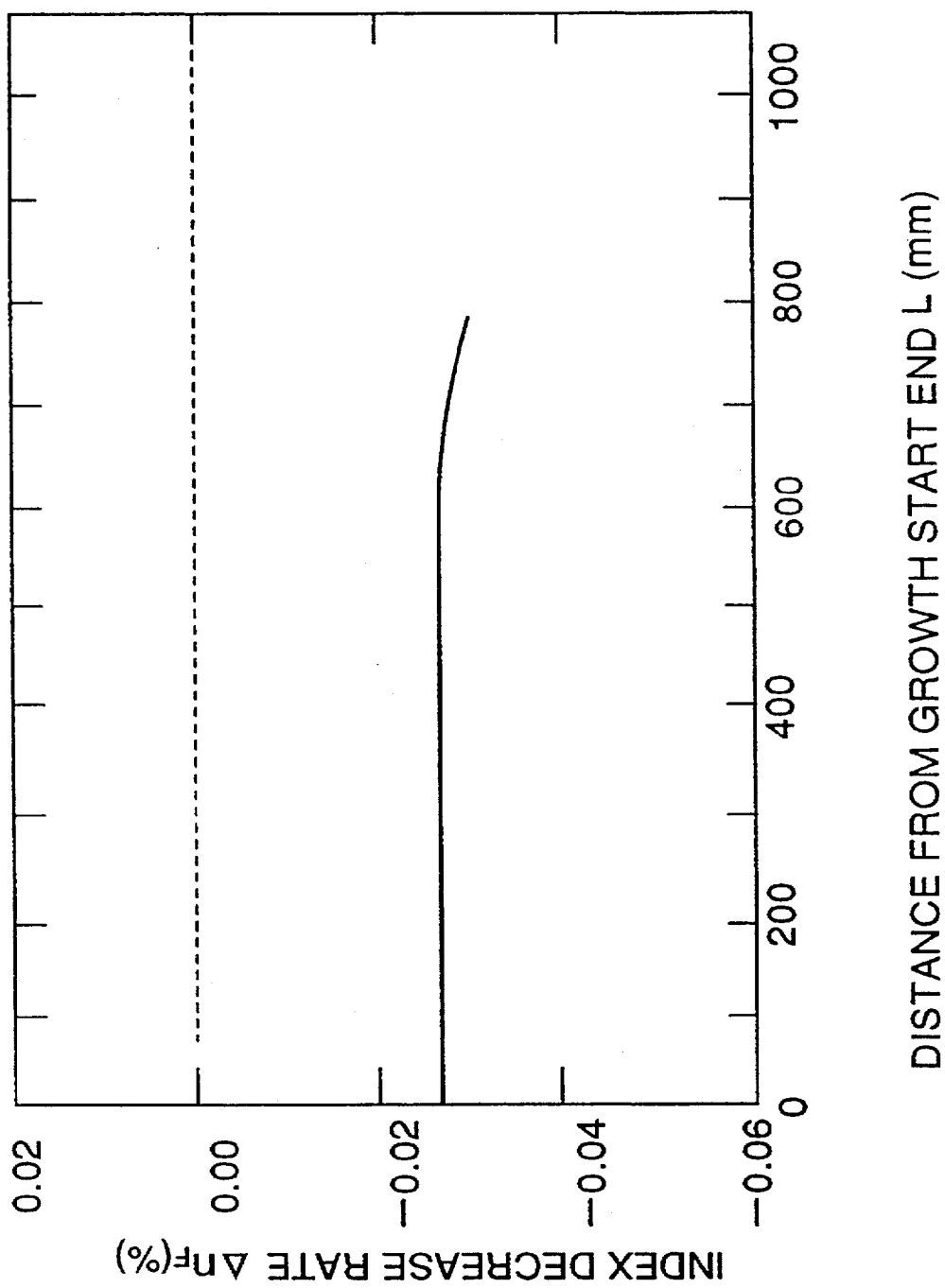
FIG. 10 is a graph to show position dependence of the decrease rate of refractive index of the fluorine-doped portion to pure silica glass in Embodiment 2.

FIG. 10 is a graph to show the measurement results of change of the decrease rate of refractive index ($\Delta n_F$) of the glass portion to become the internal cladding, obtained in the present embodiment, to pure silica glass in the growth direction. In the glass body obtained in the present embodiment, the absolute value of the difference between the value at the growth start end and the value at the growth stop end of the decrease rate of refractive index of the glass portion to become the internal cladding to pure silica glass was 0.001%.

Next, in the same manner as in Embodiment 1, the glass soot for external cladding was let to grow in the axial direction as shown in FIG. 9.

Then the glass soot for external cladding was heated to be transparentized in the same manner as in FIGS. 6 and 7, thereby obtaining a glass preform for optical fiber.

The glass preform for optical fiber thus obtained was drawn into a fiber, thus fabricating an optical fiber in the outer diameter of 125 μm. The cut-off wavelengths $\lambda_c$ were measured for the optical fiber. From the measurement results, the absolute value of the difference between the cut-off wavelength in the portion of the optical fiber corresponding to the growth start end of the glass preform for optical fiber and the cut-off wavelength in the portion of the optical fiber corresponding to the growth stop end of the glass preform for optical fiber was 5 nm.

(Embodiment 3)

In the present embodiment, the length of growth of the porous soot in Embodiment 1 was 1100 mm, and when the soot for internal cladding was let to grow by deposition of glass particles of FIG. 5, the supply amount of $CF_4$ gas Vf(t) [unit: SCCM] was increased according to the following equations as keeping the other supply amounts constant:

$$Vf(t)=50;\ 0 \leq t < t_s$$

$$Vf(t)=50(t/t_e)+50;\ t_s \leq t \leq t_e$$

where t: passing time from start of growth $t_s$: passing time from start of growth up to the length of 300 mm $t_e$: passing time from start of growth up to the end of growth;

whereby the supply amount having been 50 SCCM at start of deposition was increased up to the supply amount of 100 SCCM at end of deposition.

After that, the dehydration process and transparent glass forming process as shown in FIGS. 6 and 7 were carried out in the same manner as in Embodiment 1, thereby obtaining a glass body.

Figure 11:
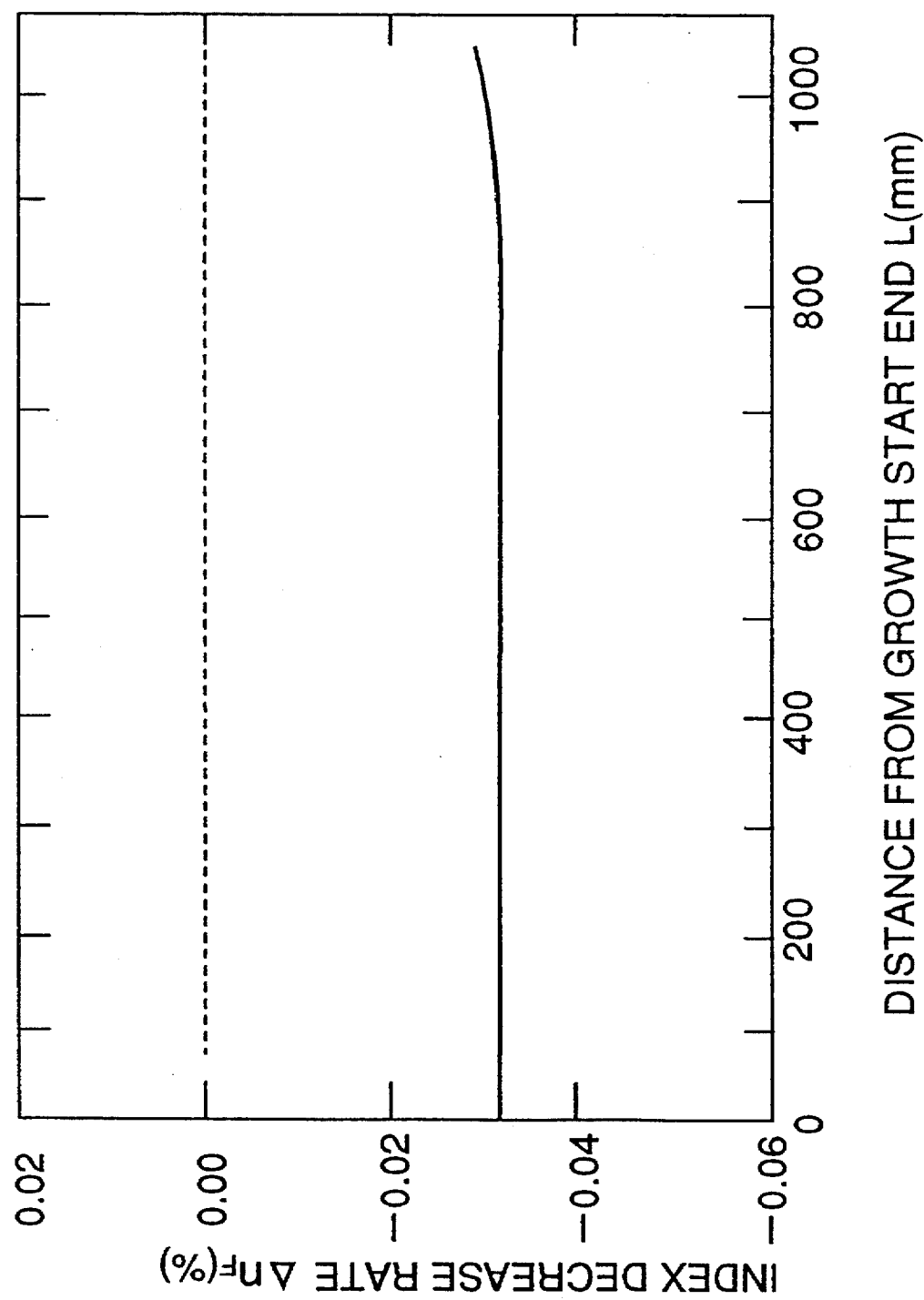
FIG. 11 is a graph to show position dependence of the decrease rate of refractive index of the fluorine-doped portion to pure silica glass in Embodiment 3.

FIG. 11 is a graph to show the measurement results of change of the decrease rate of refractive index ($\Delta n_F$) of the glass portion to become the internal cladding, obtained in the present embodiment, to pure silica glass in the growth direction. In the glass body obtained in the present embodiment, the absolute value of the difference between the value at the growth start end and the value at the growth stop end of the decrease rate of refractive index of the glass portion to become the internal cladding to pure silica glass was 0.004%.

Next, in the same manner as in Embodiment 1, the glass soot for external cladding was let to grow in the axial direction as shown in FIG. 9.

Then the glass soot for external cladding was heated to be transparentized in the same manner as in FIGS. 6 and 7, thereby obtaining a glass preform for optical fiber.

The glass preform for optical fiber thus obtained was drawn into a fiber, thus fabricating an optical fiber in the outer diameter of 125 μm. The cut-off wavelengths $\lambda_c$ were measured for the optical fiber. From the measurement results, the absolute value of the difference between the cut-off wavelength in the portion of the optical fiber corresponding to the growth start end of the glass preform for optical fiber and the cut-off wavelength in the portion of the optical fiber corresponding to the growth stop end of the glass preform for optical fiber was 18 nm.

(Embodiment 4)

In the present embodiment, the length of growth of the porous soot in Embodiment 1 was 1100 mm, and when the soot for internal cladding was let to grow by deposition of glass particles of FIG. 5, the supply amount of $CF_4$ gas Vf(t) [unit: SCCM] was increased according to the following equations as keeping the other supply amounts constant:

$$Vf(t)=50;\ 0 \leq t < t_s$$

$$Vf(t)=75(t/t_e)^2+50;\ t_s \leq t \leq t_e$$

where t: passing time from start of growth $t_s$: passing time from start of growth up to the length of 300 mm $t_e$: passing time from start of growth up to the end of growth;

whereby the supply amount having been 50 SCCM at start of deposition was increased up to the supply amount of 125 SCCM at end of deposition.

After that, the dehydration process and transparent glass forming process as shown in FIGS. 6 and 7 were carried out in the same manner as in Embodiment 1, thereby obtaining a glass body.

Figure 12:
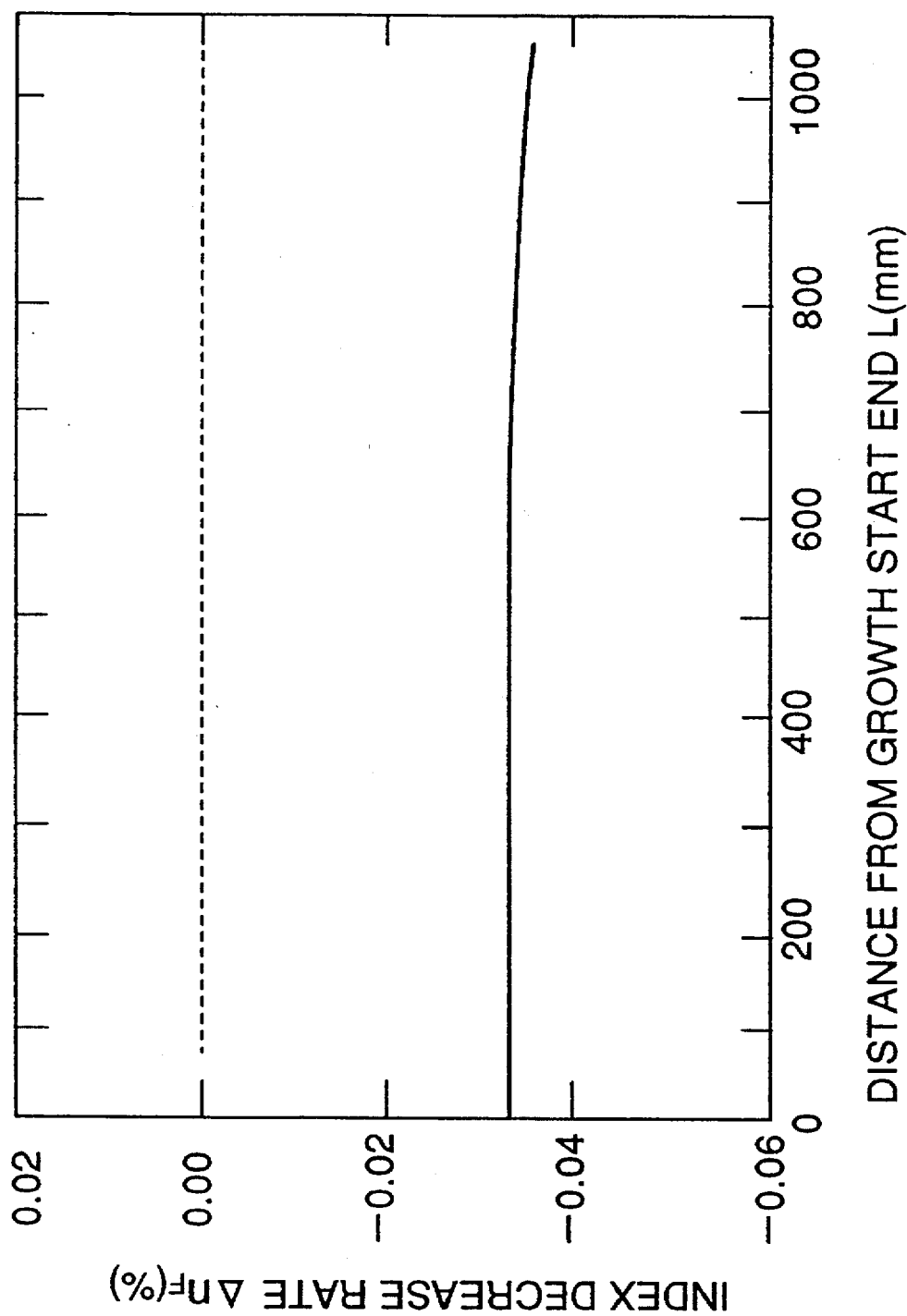
FIG. 12 is a graph to show position dependence of the decrease rate of refractive index of the fluorine-doped portion to pure silica glass in Embodiment 4.

FIG. 12 is a graph to show the measurement results of change of the decrease rate of refractive index ($\Delta n_F$) of the glass portion to become the internal cladding, obtained in the present embodiment, to pure silica glass in the growth direction. In the glass body obtained in the present embodiment, the absolute value of the difference between the value at the growth start end and the value at the growth stop end of the decrease rate of refractive index of the glass portion to become the internal cladding to pure silica glass was 0.002%.

Next, in the same manner as in Embodiment 1, the glass soot for external cladding was let to grow in the axial direction as shown in FIG. 9.

Then the glass soot for external cladding was heated to be transparentized in the same manner as in FIGS. 6 and 7, thereby obtaining a glass preform for optical fiber.

The glass preform for optical fiber thus obtained was drawn into a fiber, thus fabricating an optical fiber in the outer diameter of 125 μm. The cut-off wavelengths $\lambda_c$ were measured for the optical fiber. From the measurement results, the absolute value of the difference between the cut-off wavelength in the portion of the optical fiber corresponding to the growth start end of the glass preform for optical fiber and the cut-off wavelength in the portion of the optical fiber corresponding to the growth stop end of the glass preform for optical fiber was 14 nm.

For comparison with the glass preforms for optical fiber fabricated in the above embodiments, the inventors fabricated a glass preform for optical fiber as a comparative example under the conditions that the length of growth of the porous soot was 1100 mm and the supply amount of $CF_4$ was kept constant at 50 SCCM.

Figure 13:
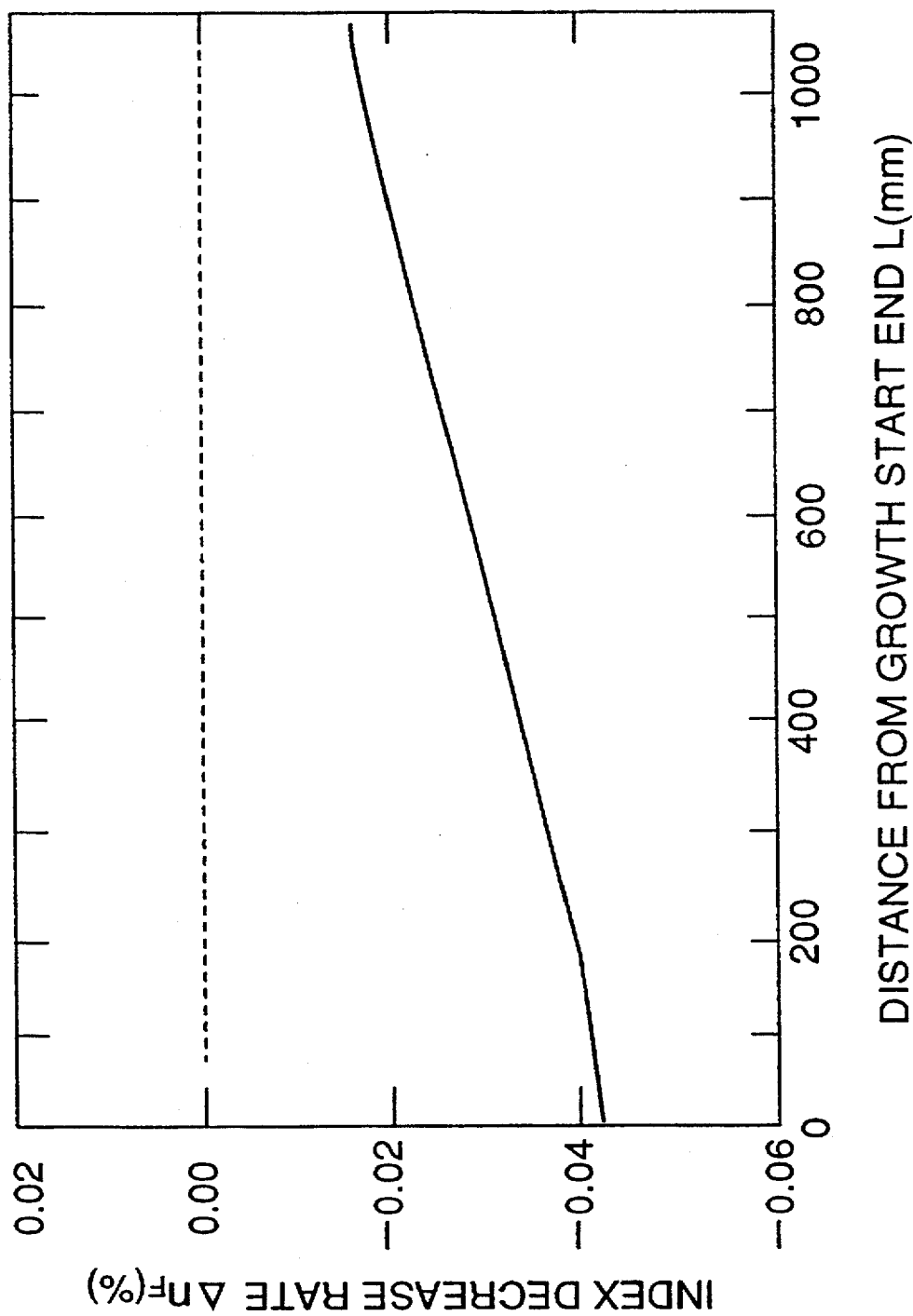
FIG. 13 is a graph to show position dependence of the decrease rate of refractive index of the fluorine-doped portion to pure silica glass in a comparative example.

FIG. 13 is a graph to show the change depending upon the position, of the decrease rate of refractive index ($\Delta n_F$) of the glass portion to become the internal cladding in the glass preform for optical fiber as the comparative example. From FIG. 13, the absolute value of the difference between the value at the deposition start end and the value at the deposition stop end of $\Delta n_F$ of the glass preform for optical fiber of the comparative example was 0.02%.

Next, in the same manner as in Embodiment 1, the glass soot for external cladding was let to grow in the axial direction as shown in FIG. 9.

Then the glass soot for external cladding was heated to be transparentized in the same manner as in FIGS. 6 and 7, thereby obtaining a glass preform for optical fiber.

The glass preform for optical fiber thus obtained was drawn into a fiber, thus fabricating an optical fiber in the outer diameter of 125 μm. The cut-off wavelengths $\lambda_c$ were measured for the optical fiber. From the measurement results, the change of the cut-off wavelength after drawn into a fiber was 100 nm.

The above confirmed that the present invention is effective as a method for fabricating a glass preform for optical fiber having a uniform index profile independent of the position.

The present invention can be modified without having to be limited to the above embodiments. For example, the above embodiments used $CF_4$ as a fluoride compound, but the same effect can be achieved by using another fluoride compound selected from $CCl_2F_2$, $C_2F_6$, $SiF_4$, $SF_6$, and the like.

Figure 14:
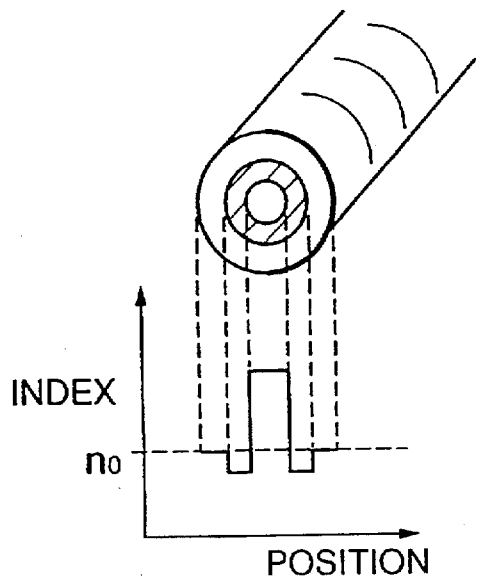
FIGS. 14 to 17 are explanatory drawings to show examples of index profile of glass preforms for optical fiber to which the present invention is applicable.
Figure 15:
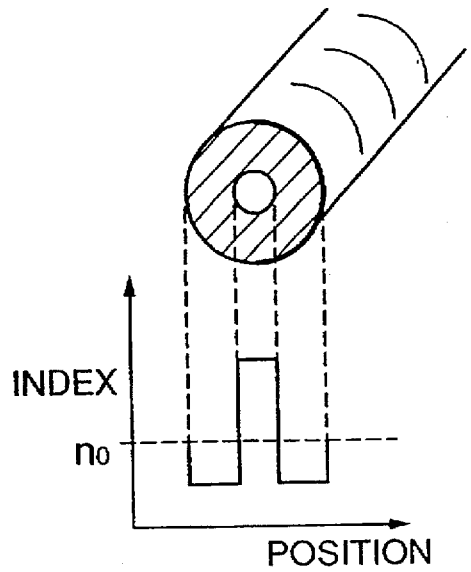
Figure 16:
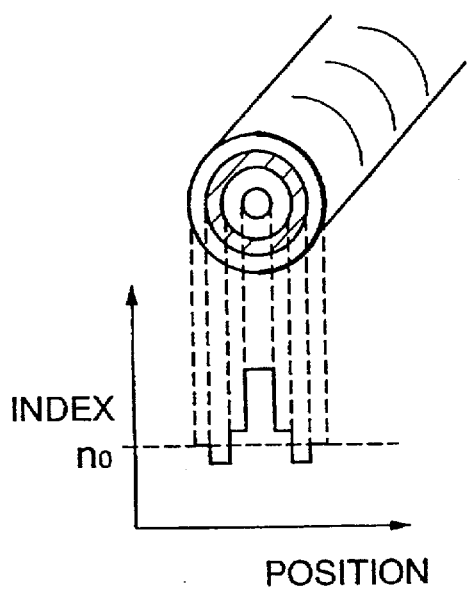
Figure 17:
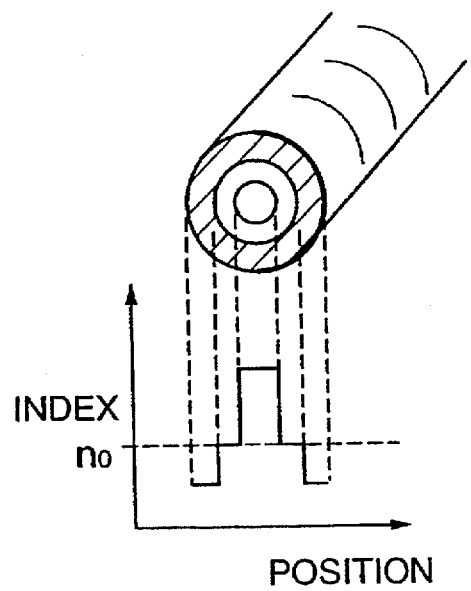

The above embodiments concerned the glass preforms for optical fiber with the index profile shown in FIG. 14, but the present invention can also be applied to formation of a glass body in a portion having a lower refractive index than that of pure silica glass in fabrication of glass preforms for optical fiber with either one of the index profiles shown in FIGS. 15 to 17.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 315469/1995 filed on Dec. 4, 1995 is hereby incorporated by reference.

What is claimed is:

1. A method of fabricating a glass preform for optical glass fibers having a silica glass portion doped with fluorine by vapor phase axial deposition, comprising the steps of:

(a) introducing a glass raw material gas and a fluorine compound gas into an oxyhydrogen flame;

(b) depositing fine glass particles in a direction of a target axis by flame hydrolysis;

(c) growing a deposit body of said fine glass particles in said direction of the target axis, wherein a period of growth of said deposit body of the fine glass particles further comprises a period during which an initial flow rate of said fluorine compound gas ($V_1$) introduced into said oxyhydrogen flame is monotonically and linearly increased to a final flow rate of said fluorine compound gas ($V_2$); and (d) heating to transparentize said deposit body of said fine glass particles.

2. The method of claim 1, wherein said increase in the fluorine compound gas flow rate results in a final flow rate 1.5 to 2.5 times greater than the initial fluorine compound gas flow rate.

3. The method of claim 1, wherein the fluorine compound gas flow rate ($V_f$) is expressed by the equation:

$$V_f = (V_2 - V_1) t/t_e + V_1$$

where:

(a) $V_1$ is an initial flow rate of the fluorine compound gas;
   (b) $V_2$ is a final flow rate of the fluorine compound gas;
   (c) t represents a passing time from a start of a period of growth; and
   (d) $t_e$ represents a passing time from said start of a period of growth to an end of said period of growth.

4. The method of claim 1, wherein the fluorine compound gas flow rate ($V_f$) is expressed by one of the following equations:

$$V_f = V_1, \text{ if } 0 \leq t < t_s; \quad \text{(i)}$$

$$V_f = (V_2 - V_1)\{(t-t_s)/(t_e-t_s)\} + V_1 \text{ if } t_s \leq t \leq t_e; \quad \text{(ii)}$$

where:

(a) $V_1$ is an initial flow rate of the fluorine compound gas;
   (b) $V_2$ is a final flow rate of the fluorine compound gas;
   (c) t represents a passing time from a start of a period of growth;
   (d) $t_s$ represents a passing time from said start of a period of growth to a start of said increase of the flow rate of the fluorine compound gas; and
   (e) $t_e$ represents a passing time from said start of a period of growth to an end of said period of growth.

5. The method of claim 1, wherein said glass preform for optical fiber comprises a glass portion to become a core portion and a glass portion to become a cladding portion, wherein said silica portion doped with fluorine is at least a part of said glass portion to become the cladding portion, and said silica glass portion doped with fluorine surrounds said core portion.

6. A method of fabricating a glass preform for optical glass fibers having a silica glass portion doped with fluorine by vapor phase axial deposition, comprising the steps of:

(a) introducing a glass raw material gas and a fluorine compound gas into an oxyhydrogen flame;

(b) depositing fine glass particles in a direction of a target axis by flame hydrolysis;

(c) growing a deposit body of said fine glass particles in said direction of the target axis, wherein a period of growth of said deposit body of the fine glass particles further comprises a period during which an initial flow rate of said fluorine compound gas ($V_1$) introduced into said oxyhydrogen flame is monotonically increased to a final flow rate of said fluorine compound gas ($V_2$); and (d) heating to transparentize said deposit body of said fine glass particles, wherein the fluorine compound gas flow rate ($V_f$) is monotonically increased according to the following equation:

$$V_f = (V_2 - V_1)(t/t_e)^2 + V_1$$

where:

(a) $V_1$ is an initial flow rate of the fluorine compound gas;
   (b) $V_2$ is a final flow rate of the fluorine compound gas;
   (c) t represents a passing time from a start of growth; and
   (d) $t_e$ represents a passing time from a start of growth to an end of growth.

7. A method of fabricating a glass preform for optical glass fibers having a silica glass portion doped with fluorine by vapor phase axial deposition, comprising the steps of:

(a) introducing a glass raw material gas and a fluorine compound gas into an oxyhydrogen flame;

(b) depositing fine glass particles in a direction of a target axis by flame hydrolysis;

(c) growing a deposit body of said fine glass particles in said direction of the target axis, wherein a period of growth of said deposit body of the fine glass particles further comprises a period during which an initial flow rate of said fluorine compound gas ($V_1$) introduced into said oxyhydrogen flame is monotonically increased to a final flow rate of said fluorine compound gas ($V_2$); and (d) heating to transparentize said deposit body of said fine glass particles, wherein the fluorine compound gas flow rate ($V_f$) is monotonically increased according to one of the following equations:

$$V_f = V_1, \text{ if } 0 \leq t < t_s; \quad \text{i.}$$

$$V_f = (V_2 - V_1)\{(t-t_s)/(t_e-t_s)\}^2 + V_1, \text{ if } t_s \leq t < t_e; \quad \text{ii.}$$

where:

(a) $V_1$ is an initial flow rate of the fluorine compound gas;
   (b) $V_2$ is a final flow rate of the fluorine compound gas;
   (c) t represents a passing time from a start of growth;
   (d) $t_s$ represents a passing time from a start of growth to a start of said increase of the flow rate of the fluorine compound gas; and
   (e) $t_e$ represents a passage of time from a start of growth to an end of growth.

* * * * *